United States Patent
Kaskawitz et al.

(10) Patent No.: US 12,520,752 B2
(45) Date of Patent: Jan. 13, 2026

(54) LAWN MOWER AND MACHINE APPARATUS AND METHOD WITH STORAGE FEATURES

(71) Applicant: Honda Motor Co., Ltd., Tokyo (JP)

(72) Inventors: Scott J. Kaskawitz, Hillsborough, NC (US); Marie-Claire Kore, Cary, NC (US); Christopher Todd Walker, Hillsborough, NC (US); Kenneth F. Linderman, Durham, NC (US); Kyle E. Long, Hurdle Mills, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 655 days.

(21) Appl. No.: 17/590,772

(22) Filed: Feb. 1, 2022

(65) Prior Publication Data

US 2023/0240183 A1   Aug. 3, 2023

(51) Int. Cl.
| | | |
|---|---|---|
| *A01D 34/82* | (2006.01) | |
| *A01D 34/24* | (2006.01) | |
| *A01D 34/68* | (2006.01) | |
| *A01D 34/78* | (2006.01) | |
| A01D 101/00 | (2006.01) | |

(52) U.S. Cl.
CPC ......... *A01D 34/24* (2013.01); *A01D 34/6806* (2013.01); *A01D 34/78* (2013.01); *A01D 2101/00* (2013.01)

(58) Field of Classification Search
CPC .. A01D 34/00–34/905; A01D 2101/00; A01D 34/824; A01D 64/6806; A01D 34/78
See application file for complete search history.

(56) References Cited

U.S. PATENT DOCUMENTS

| 4,480,851 A | 11/1984 | St-Pierre |
| 5,261,215 A | 11/1993 | Hartz et al. |
| (Continued) | | |

FOREIGN PATENT DOCUMENTS

| AT | 501857 B1 * | 7/2007 |
| CN | 201821663 U * | 5/2011 |
| (Continued) | | |

OTHER PUBLICATIONS

AT 501857 B1 (Year: 2007).*

*Primary Examiner* — Joseph M Rocca
*Assistant Examiner* — Madeline I Runco
(74) *Attorney, Agent, or Firm* — KENEALY VAIDYA LLP (57) ABSTRACT

The disclosed subject matter is directed to an electric lawn machine and method for use. The machine can include a housing and a tool, such as a lawnmower blade. A front pair of drive wheels, rear pair of drive wheels, and a storage surface/wheels can be connected to the housing. The housing can be configured to be placed upon a ground surface in two different positions: a use position in which the front pair of drive wheels and the rear pair of drive wheels contact the ground surface; and, a storage position in which the rear pair of drive wheels and the storage surface/wheel(s) contact the ground surface. A handle can be provided that is moveable between a use position, storage position, and an intermediate position in which the machine can be pulled/pushed around into and out of storage by the handle.

16 Claims, 6 Drawing Sheets

(56) References Cited

U.S. PATENT DOCUMENTS

| | | | |
|---|---|---|---|
| 5,340,145 A | 8/1994 | Leib et al. | |
| 9,038,356 B2 | 5/2015 | Shao et al. | |
| 9,433,147 B2 | 9/2016 | Schmalz | |
| 9,848,531 B2* | 12/2017 | Wadzinski | A01D 34/001 |
| 9,888,627 B2 | 2/2018 | Yamaoka et al. | |
| 10,465,642 B2* | 11/2019 | Rotter | F02M 37/046 |
| 10,477,772 B2 | 11/2019 | Yamaoka et al. | |
| 2013/0111866 A1* | 5/2013 | Schmalz | A01D 34/68 |
| | | | 123/196 R |
| 2014/0196425 A1* | 7/2014 | Lewis | A01D 34/78 |
| | | | 56/16.7 |
| 2017/0202138 A1* | 7/2017 | Pellenc | A01D 34/81 |
| 2017/0223890 A1* | 8/2017 | Jiao | A01D 34/81 |
| 2018/0228089 A1* | 8/2018 | Yamaoka | A01D 34/6806 |
| 2021/0251139 A1* | 8/2021 | Frick | G01C 21/3867 |
| 2022/0287234 A1* | 9/2022 | Wrase | A01D 34/824 |
| 2023/0012954 A1* | 1/2023 | Schaedler | A01D 75/00 |
| 2023/0048445 A1* | 2/2023 | Ertl | A01D 34/6806 |
| 2024/0049631 A1* | 2/2024 | Porter | A01D 34/68 |

FOREIGN PATENT DOCUMENTS

| | | | | |
|---|---|---|---|---|
| CN | 202476097 U | * | 10/2012 | ............ A01D 34/37 |
| DE | 202006003364 U1 | * | 6/2006 | ........... A01D 43/063 |
| EP | 1731016 A2 | * | 12/2006 | ............ A01D 34/81 |
| JP | 08172843 A | * | 7/1996 | |
| JP | 2015097476 A | * | 5/2015 | |
| WO | WO-2021088602 A1 | * | 5/2021 | |

* cited by examiner

LAWN MOWER AND MACHINE APPARATUS AND METHOD WITH STORAGE FEATURES

BACKGROUND

The disclosed subject matter relates to lawn mowers and machines that include storage structures and features. More particularly, the disclosed subject matter relates to methods and apparatus for storing electric lawn mowers and machines when not being used.

SUMMARY

Some embodiments are directed to an electric lawn machine, that can include a housing having a deck. A rotary tool can be located under the deck and connected to the housing by a rotary shaft configured to rotate with respect to the housing about a rotary tool axis, the housing being moveable between a use position where the rotary tool axis is substantially perpendicular to a ground surface upon which the electric lawn machine is configured to travel and a storage position where the rotary tool axis is substantially parallel with the ground surface. A front pair of main wheels can each be connected to the housing about a respective one of a pair of front rotary main axes, and located at a front side of the housing. A rear pair of main wheels can each be connected to the housing about a respective one of a pair of rear rotary main axes, and located at a rear side of the housing such that the rotary shaft is located between the pair of rear rotary main axes and the pair of front rotary main axes. A handle can be connected to the housing at a connection location, the handle having two arms extending from the housing and moveable with respect to the housing between a storage state position and a use state position. When the handle is in the use state position a substantial portion of the handle can extend from the connection location and in a direction away from the rotary tools axis such that the rotary tool axis is spaced from and does not intersect with the handle. When the handle is in the storage state position the substantial portion of the handle can extend from the connection location and in a direction toward the rotary axis such that the rotary tool axis is located between the two arms of the handle. One of a storage wheel and a storage plastic structure can be located at a position above the pair of rear wheels in a vertical direction parallel with the rotary tool axis, wherein the storage plastic structure has a coefficient of friction that is less than a coefficient of friction of the housing, and an imaginary tangent line that extends from the pair of rear wheels can be coplanar in an imaginary storage tangent plane with an imaginary tangent line that extends from one of the storage wheel and the storage plastic structure such that the storage tangent plane is spaced from the housing and the pair of rear wheels and the one of the storage wheel and the storage plastic structure are points of contact with the ground surface when the housing is in the storage position.

Some embodiments are directed to an electric lawn machine that can include a housing having a deck. An electric power source can be located adjacent the deck. A tool can be located within the housing and electrically connected to the electric power source. A front pair of main wheels can each be connected to the housing about a respective one of a pair of front rotary main axes, and located at a front side of the housing. A rear pair of main wheels can each be connected to the housing about a respective one of a pair of rear rotary main axes, and located at a rear side of the housing. Imaginary tangent lines extending from a lowermost point of each of the front pair of main wheels and rear pair of main wheels can be located within an imaginary ground contact tangent plane in which the front pair of main wheels and rear pair of main wheels are configured to contact a ground surface when the electric lawn machine is in a use position. A handle can be connected to the housing at a handle connection location. The handle can have a proximal end and a distal end, the proximal end connected to the housing at the handle connection location and extending away from the housing to the distal end of the handle. The distal end of the handle can be configured for gripping by a user during use. The handle can be moveably connected with respect to the housing between a storage state position and a use state position, wherein when the handle is in the use state position the distal end of the handle is located a first distance from the power source, and when the handle is in the storage state position the distal end of the handle is located a second distance from the power source, wherein the first distance is larger than the second distance. A storage wheel can be located at a position above the pair of rear wheels in a vertical direction. Another imaginary tangent line that extends from at least one of the pair of rear wheels can be coplanar in an imaginary storage tangent plane with an imaginary tangent line that extends from the storage wheel such that the storage tangent plane is substantially perpendicular to the ground contact tangent plane, such that the storage wheel and pair of rear wheels are configured to contact the ground surface when the electric lawn machine is in a storage position rotated away from the use position.

Some embodiments are directed to an electric lawn machine that can include a housing and a tool located in the housing. An electric power source can be located in the housing and configured to operate the tool. A front pair of main wheels can each be connected to the housing about a respective one of a pair of front wheel axes, and located at a front side of the housing. A rear pair of main wheels can each be connected to the housing about a respective one of a pair of rear wheel axes, and located at a rear side of the housing. A rear pair of storage wheels can each be connected to the housing about a respective one of a pair of storage wheel axes, and located at a rear side of the housing and spaced from the rear pair of main wheels in a vertical direction. The housing can be configured to be placed upon a ground surface in a use position in which the front pair of main wheels and the rear pair of main wheels contact the ground surface, such that the electric lawn machine is configured to traverse the ground surface during operation of the tool via rolling of the front pair of main wheels and rear pair of main wheels, and a storage position in which the rear pair of main wheels and rear pair of storage wheels contact the ground surface, such that the electric lawn machine is configured to traverse the ground surface and be placed into storage via rolling of at least one of the rear pair of main wheels and rear pair of storage wheels.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
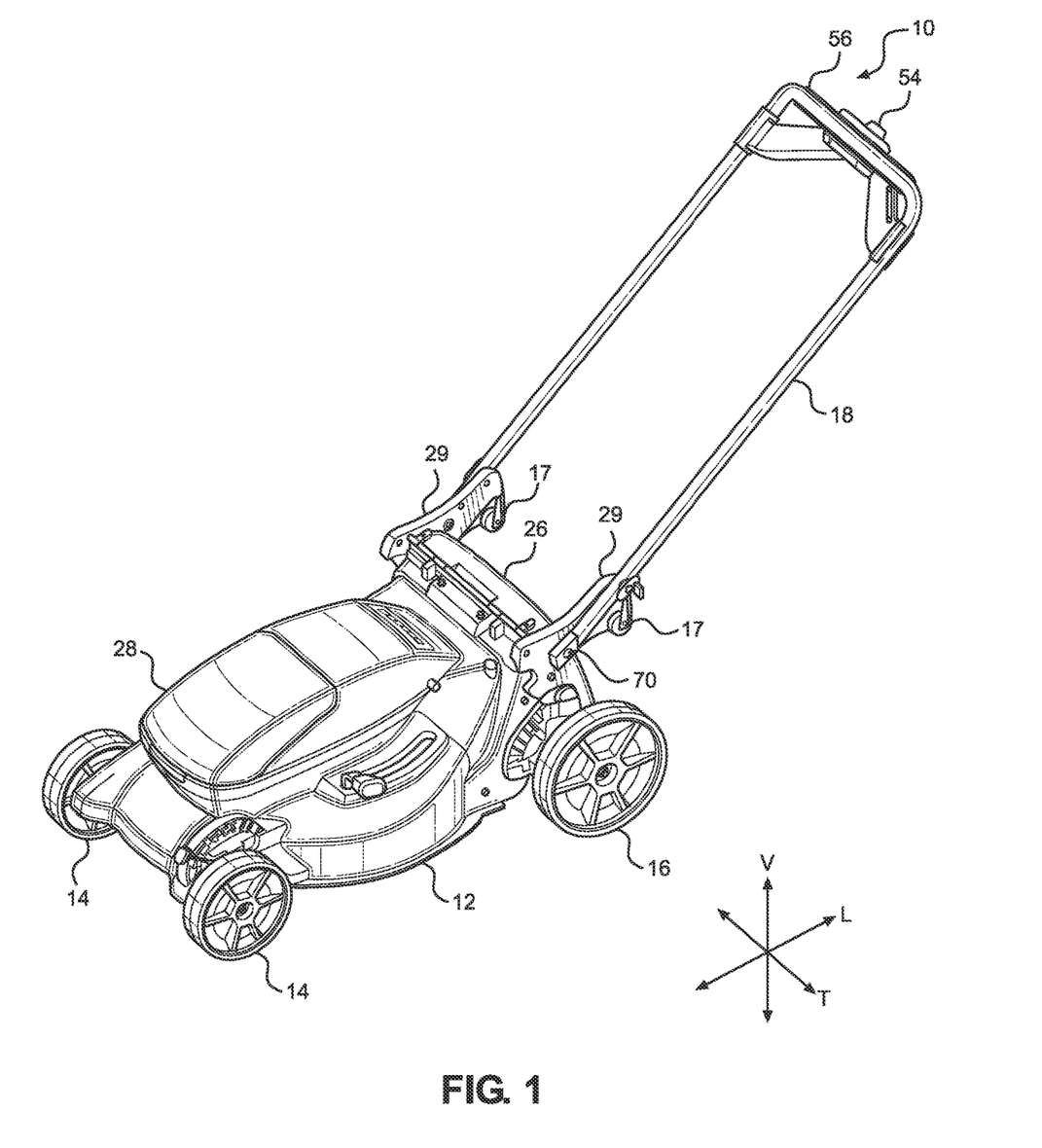
FIG. 1 is a perspective view of a lawn machine made in accordance with principles of the disclosed subject matter.

FIG. 1 is a perspective view of a lawn machine 10 made in accordance with principles of the disclosed subject matter. The lawn machine 10 can include a housing 28 in which a tool 22, for example, a blade is located. The housing 28 can include a deck 12 along with a lock plate 29 to which a handle 18 can be attached. A pair of front main wheels 14 and a pair of rear main wheels 16 can be attached to the housing 28 in a manner such that the law machine 10 can be moved on a ground surface via rolling of the wheels 14, 16 during use or operation of the tool 22. The handle 18 can include two arms each having a proximal end rotationally connected to a respective lock plate 29 of the housing 28. Each of the arms of the handle 18 can extend away from their respective connection point at the lock plate 29 to a distal end 18d of the handle 18. In this embodiment, the handle 18 includes a connection bar that joins the arms at their respective distal ends to form a grip which a user can push and/or otherwise operate the lawn machine 10. A controller 56 or other input structure 54 can be attached to the connection bar at the distal end 18d of the handle 18.

The lawn machine 10 and housing 18 will be referred to as having a transverse direction T, a vertical direction V, and a lateral direction L as shown. The traverse direction T can be parallel to the rotational axes of the wheels 14, 16. The lateral direction T can be perpendicular to the rotational axes of the wheels 14, 16 and along a direction of typical forward and reverse travel for the lawn machine. The vertical direction V can be perpendicular to both the lateral direction L and transverse direction T and, in some embodiments, parallel to a rotational axis of the tool 22 in an "up" and "down" direction. A pair of storage wheels 17 can be connected to the housing 28, for example, at each of the lock plates 29, and spaced in the vertical direction V from the pair of rear main wheels 16.

The lawn machine 10 is in a use state position as depicted in FIG. 1. In the use position, a substantial portion (e.g., more than half) of the handle 18 (in this embodiment almost all of the handle 18) extends from the connection point 70 away from the housing 28 and away from the tool 22 and other components located within the housing 28. Thus, a user can push and/or otherwise operate the lawn machine 10 via the handle 18 while walking behind the machine 10.

Figure 2:
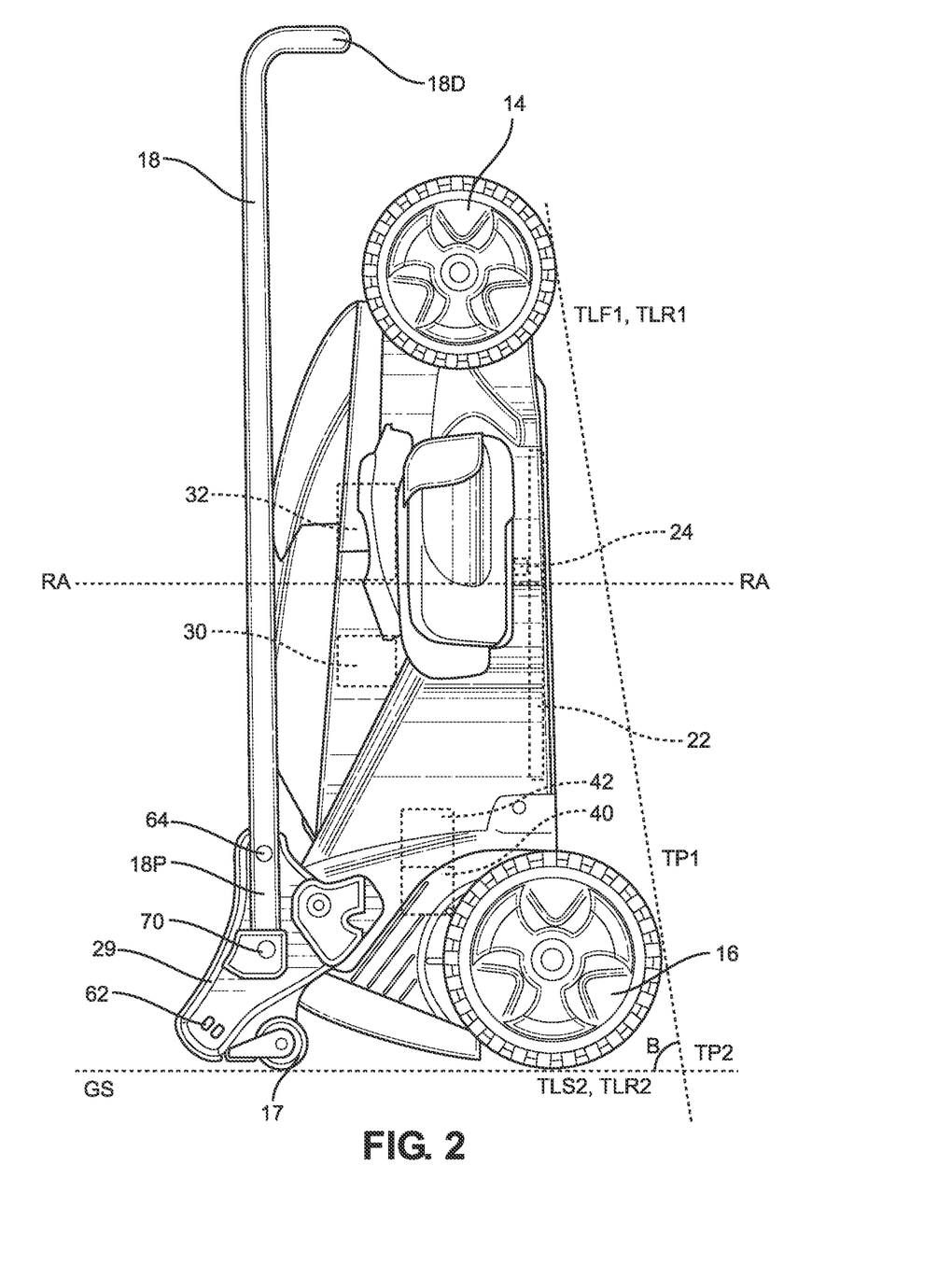
FIG. 2 is a side view of the lawn machine of FIG. 1.

FIG. 2 is a side view of the lawn machine 10 when in a storage state position. In the storage position, the handle 18 is rotated with respect to the housing 28 from the use state position to a position in which a substantial portion of the handle 18 extends from the connection point 70 towards the area in which the tool 22 and other components are located within the housing 28 and closer to the majority of the housing 28 as compared to when in the use state position. In this case, the handle 18 is rotated approximately 160 degrees from the use state position. When the tool 22 is configured as a rotary blade 22 connected to the housing by a rotary shaft 24 that rotates about a rotary axis RA, the rotary axis RA can extend between the two arms of the handle 18 that extend from the connection points 70 when the machine 10 is in the storage state position. The handle 18 can include a lock structure 64 that is configured to lock the handle 18 in place with respect to the housing 28 at mating lock structures 62 located on the lock plate 29 of the housing 28. In the embodiment of FIG. 2, there are two lock structures 62 located on the lock plate 29 that selectively lock the handle 18 with respect to the housing 28 at each of the use state position (FIG. 1) and the storage state position (FIG. 2). The lock structures 62 on the lock plate 29 can be an opening such as a through hole, aperture, or indent in the lock plate 29. The lock structures 64 on the handle 18 can be a spring loaded pin that is biased towards the lock plate 29 and lock structures 62 such that when the lock structure 64 arrives at lock structure 62, the pin is forced by spring bias into the opening to lock the handle 18 with respect to the housing 28. Of course, these structures could be reversed, and the lock structures 62 could be formed as spring biased pins, and lock structures 64 could be formed as an opening(s), depending on application and design.

The handle 18 can include a distal end 18d located closer in linear distance to a power source/battery 30 and/or power source/motor 32 when in the storage state position as compared to a linear distance from the distal end 18d to the power source/battery 30 and/or power source/motor 32 when in a use state position. The proximal end 18p of the handle 18 can be rotationally connected to the lock plate 29 of the housing 28 by connection structure 70. The connection structure 70 can be a pin, a rotary bearing, a cam structure, a hinge, or other known structure that allows the handle 18 to move and/or rotate with respect to the housing 28. If desired, a drive transmission 40 and propulsion motor 42 can be provided in the housing 28 to provide power to any of the wheels 14, 16 to drive the lawn machine 10 during use.

In the storage state position, the rear main wheels 16 and storage wheels 17 are configured such that they provide the points of contact between the lawn machine 10 and a ground surface GS upon which the lawn machine 10 is standing in the storage state position. In particular, in the storage state position, a tangent line TLS2 extending from an outer periphery of the storage wheel 17 can fall within a same plane TP2 as a tangent line TLR2 of the rear main wheels 16. The tangent plane TP2 is shown as a dotted line in FIG. 2 because the plane TP2 extends orthogonally into the paper in this figure, and therefore appears as a line. The lines TLS2 and TLR2 can be separated from each other (not colinear) while still residing within this plane TP2 if the wheels 16 or 17 are offset in a transverse direction T (into the paper) of the lawn machine 10, or could be colinear if the wheels 16 and 17 reside within a plane in the vertical and lateral dimensions V, L of the lawn machine 10 (i.e., if the left storage wheel 17 rolls in the same track as the left rear main wheel 16 when in the storage position and being pushed to roll in a linear fashion, such as left to right in FIG. 2).

Also in the storage state position, a tangent line TLR1 from a bottom of the rear main wheels 16 and a tangent line TLF1 from a bottom of the front main wheels 14 can be located in a same tangent plane TP1. Tangent plane TP1 is shown as a dotted line in FIG. 2 because the plane TP1 (similar to plane TP2) extends orthogonally into the paper in this figure, and therefore appears as a line. The lines TLR1 and TLF1 can be separated from each other (not colinear) while still residing within this plane TP1 if the wheels 14 or 16 are offset in a transverse direction T (into the paper), or could be colinear if the wheels 14 and 16 reside within a plane in the vertical and lateral dimensions L, V (i.e., if the left rear main wheel 16 follows in the same track as the left front main wheel 14 when in the use state position and being operated to go forward in a linear fashion).

Figure 3:
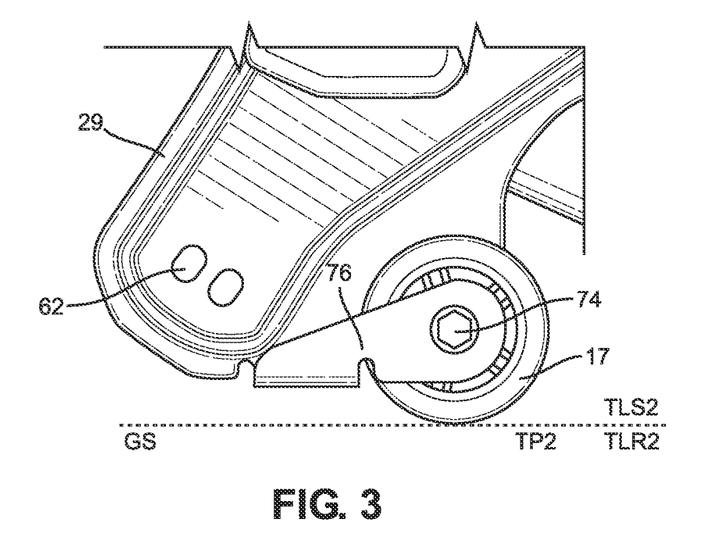
FIG. 3 is a partial detail side view of a storage wheel of the lawn machine of FIG. 1.

FIG. 3 is a partial detailed side view of the storage wheel 17 of the lawn machine 10. The wheel 17 can be attached to the lock plate 29 of housing 28 via a clip-on type metal sheath 76 through which an axle 74 about which wheel 17 rotates is located. The wheel 17 configured to rotate about axle 74 and have a ground surface GS contact point on a tangent line TLS2 that extends from a bottom most point of storage wheel 17 when lawn machine 10 is in the storage state position and both the storage wheels 17 and rear main wheels 16 are in contact with the ground surface GS. The rear main wheel 16 can have a tangent line TLR2 that extends from a bottom most point away from housing 28 of rear main wheel 16 when lawn machine 10 is in the storage state position. The tangent line TLS2 and tangent line TLR2 can both lie within a same plane TP2. When the machine is in the storage state position, the plane TP2 includes the points of contact between storage wheels 17 and the ground surface GS along with the points of contact between the rear main wheels 16 and the ground surface GS. In other words, the tangent plane TP2 includes the lower most points of wheels 16 and 17 away from housing 28. The tangent plane TP2 is shown as a dotted line in FIG. 3 because it extends into the paper in this figure.

Figure 4:
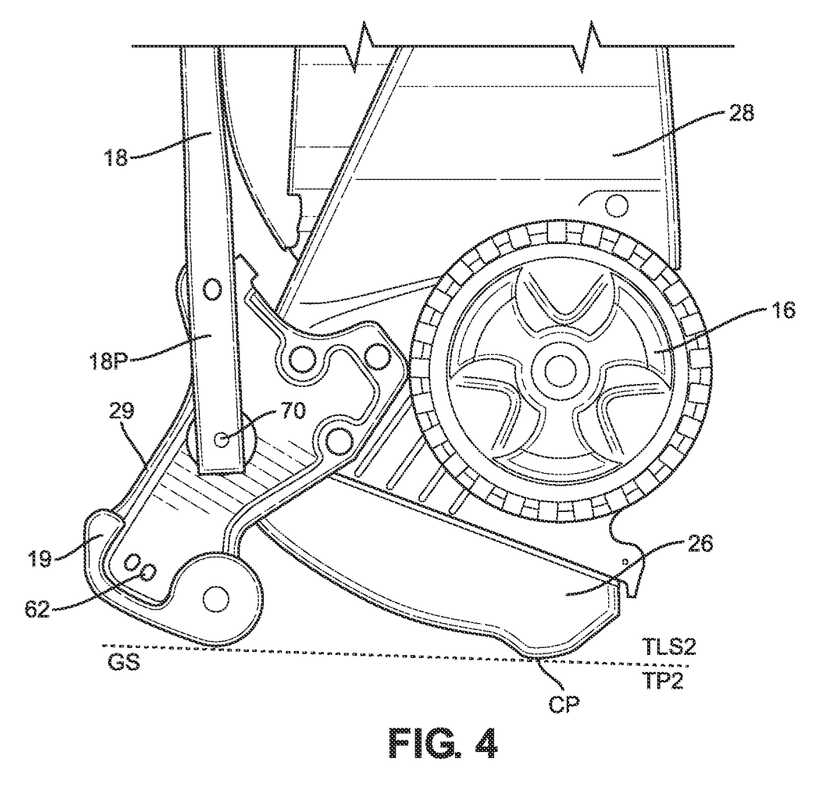
FIG. 4 is a partial side view of an alternate embodiment of a lawn machine made in accordance with principles of the disclosed subject matter.

FIG. 4 is a partial side view of an alternate embodiment of a lawn machine 10 made in accordance with principles of the disclosed subject matter. In this embodiment, the storage wheels 17 are replaced with a storage plastic structure 19 located at a position above the pair of rear wheels in the vertical direction V. This vertical direction V can be parallel with a rotary tool axis when the machine 10 is configured as a lawnmower with a tool 22 such as a blade 22 that rotates about a rotary axis RA of a blade shaft 24 attached to housing 28. The contact points with the ground surface in the storage state position can be a pair of storage plastic structures 19 and a contact point CP that can be a point or line of contact between the housing 28 and the ground surface GS. The contact point CP can be located at a rear end 26 of the housing 28. Alternatively, contact points with the ground surface GS in the storage position can be the pair of storage plastic structures 19 and the bottom most point of rear main wheels 16 (if wheels 17 are replaced with the storage plastic structures 19 in FIG. 2). The storage plastic structures 19 can have a coefficient of friction that is less than a coefficient of friction of the housing 28 such that the lawn machine 10 is easily pushed around and skidded about a ground surface GS when in the storage position. In particular, the storage plastic structures 19 can include a polyoxymethylene (POM) material that makes up the skid structure to provide the low coefficient of friction and permit easy movement of the storage plastic structures 19 along a ground surface GS.

Figure 5:
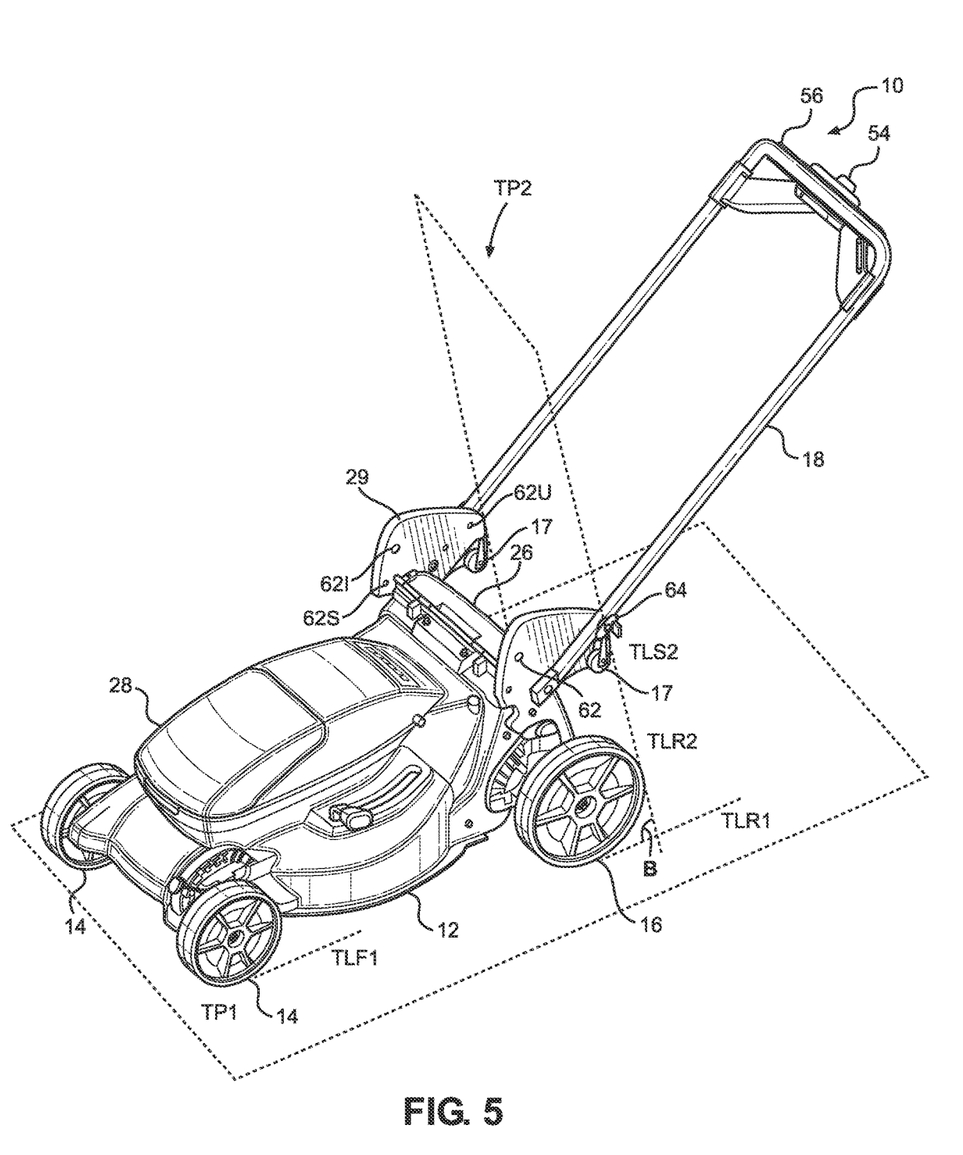
FIG. 5 is a perspective view of another embodiment of a lawn machine made in accordance with principles of the disclosed subject matter.
Figure 6:
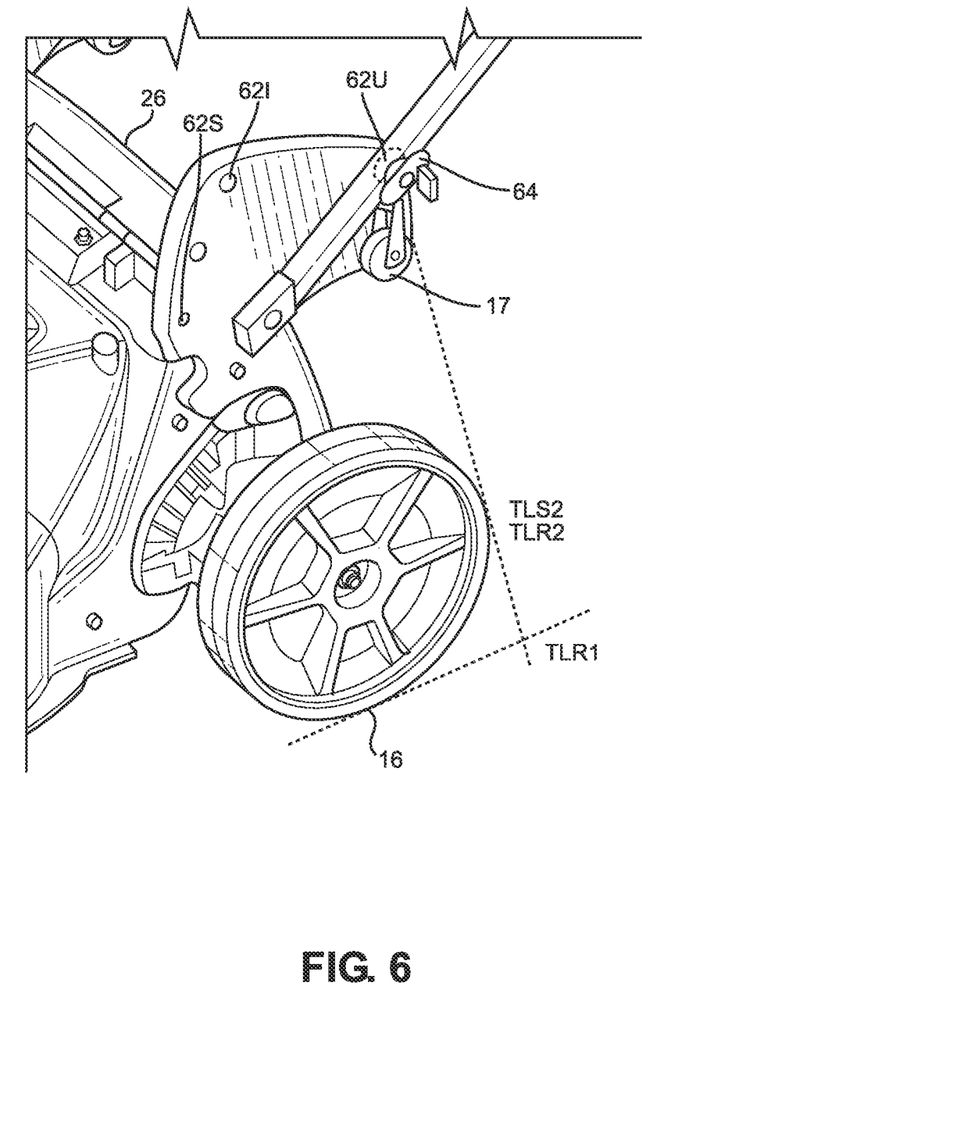
FIG. 6 is a partial detail perspective view of the lawn machine of FIG. 5.
Figure 7:
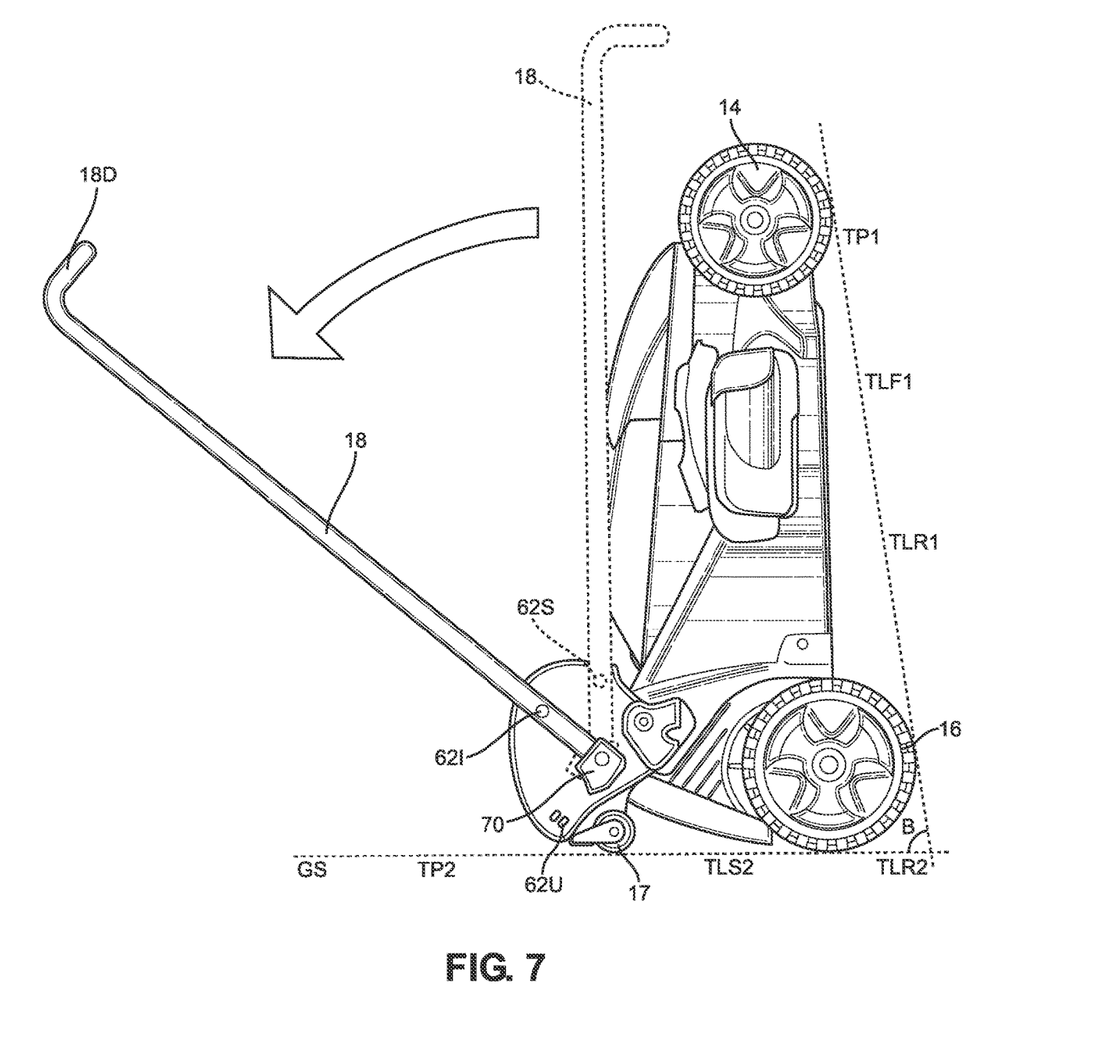
FIG. 7 is a side view of the lawn machine of FIG. 5 in an intermediate state position moved from a storage state position.

FIGS. 5-7 are a perspective view, detail view, and side view of another embodiment of a lawn machine 10 made in accordance with principles of the disclosed subject matter. The lawn machine 10 of this embodiment can include a lock plate 29 of the housing 28 that includes lock structure 62i that allows the handle 18 to be placed into an intermediate state position (See FIG. 7) located between the storage state position (See FIG. 2 and in phantom in FIG. 7) and the use state position (See FIG. 5). In the intermediate state position, the lawn machine 10 can be rolled or moved into and out of a storage area in a garage or other facility with greater ease because a force vector applied to/against handle 18 will be directed more along a longitudinal axis of the handle 18 (instead of perpendicular to the longitudinal axis of the handle 18 if the force were to be applied when the handle is in the storage position shown in dotted line in FIG. 7). Thus, less torque is applied at connection point 70 when force is applied to a distal end 18d of handle 18 when in the intermediate state position as compared to when in the storage state position.

The lock plates 29 can each extend or be part of housing 28 located adjacent left and right rear main wheels 16, respectively. The lock plates 29 can each include a storage lock structure 62s, an intermediate lock structure 62i, and a use lock structure 62u. A mating lock structure 64 located on at least one of the arms of the handle 18 can be configured to lock at each of these three separate lock structures 62s, 62i, and 62u to place the handle 18 into a storage state position, intermediate state position, and use state position, respectively. In operation, when in either the use state position or storage state position, a user can unlock the lock structure 64 from the lock structure 62u or 62s, and move the handle 18 to the intermediate state position and lock the lock structure 64 with lock structure 62i. In this intermediate state position (See FIG. 7), the user will have better leverage for rotating the housing 28 (and entire machine 10) from its use state position (See FIG. 1) to its storage state position (See FIG. 2). Likewise, when in this intermediate state position (See FIG. 7), the user will have better leverage for rotating the housing 28 (and entire machine 10) from its storage state position (See FIG. 2) to its use state position (See FIG. 1). In addition, when in the intermediate state position (See FIG. 7), a user will have better leverage for pulling and pushing the lawn machine about the ground surface GS via storage wheels 17 or storage plastic structure 19 and rear wheels 16 or housing rear end 26 (similar to rolling luggage about a ground surface) to bring the lawn machine 10 into a storage area such as up against a garage wall with tool 22 facing the wall, as well as out of the storage area.

FIG. 5 provides a perspective view of the various tangent lines and planes described above. In particular, tangent plane TP1 is shown as including tangent lines TLF1 and TLR1 (that are tangent lines extending from a bottom most point (in vertical direction) of front rear wheels 14 and rear wheels 16). The tangent lines TLF1 and TLR1 and tangent plane TP1 also coincide with the ground surface GS. Another way to describe the tangent plane TP1 is a plane in which each of the wheels 14 and 16 contact a ground surface GS during operation of the lawn machine 10 (assuming a flat planar ground surface). The four contact points of the lawn machine 10 with a ground surface GS lie within the tangent plane TP1 when in the use state position (for example, bottom points of wheels 14, 16).

Regarding the tangent plane TP2, this plane represents a plane that includes the contact points of the lawn machine 10 with a ground surface GS when the lawn machine is in the storage state position (i.e., when TP2 coincides with the ground surface GS and the lawn machine is rotated to have its front main wheels 14 located vertically above its rear main wheels 16). The planes TP1 and TP2 can be substantially perpendicular (i.e., form an angle between 75-105 degrees) with respect to each other such that the center of gravity of the lawn machine 10 is balanced or located between wheels 14 and 16 when in the use state position, and balanced or located between wheels 16 and 17 (or skid structures) when in the storage state position. The use state position of the lawn machine 10 can be described as substantially perpendicular to the storage state position of the lawn machine 10 because a user rotates the lawn machine 10 about a transverse axis of the machine approximately 90 degrees (e.g., 90 degrees plus or minus 15 degrees) to go from the use state position to the storage state position. In some embodiments, the rotation between states can occur about a rotational axis of the rear main wheels 16.

ALTERNATIVE EMBODIMENTS

While certain embodiments of the invention are described above, it should be understood that the invention can be embodied and configured in many different ways without departing from the spirit and scope of the invention.

For example, embodiments are disclosed above in the context of a lawn machine 10 shown in FIG. 1 configured as a lawnmower in which the tool 22 includes a blade and a rotary shaft 24. However, embodiments are intended to include or otherwise cover any type of lawn machine, such as a machine in which the tool 22 is configured as a leaf blower, a vacuum, a mulcher, an aerator, a cultivator, a gatherer, etc.

In another alternate embodiment, the main wheels 14, 16 and storage wheels 17 can be located in various different locations on the housing 28 provided the machine 10 can be safely moved from a use state position resting on wheels 14, 16 to a storage state position resting on wheels 16, 17.

The power source battery and motor 30, 32 can include an internal combustion engine, an electric motor, or a hybrid of an internal combustion engine and an electric motor. The power source and motor 30, 32 can be mounted forward of the front axles for wheels 14, rearward of the rear axles for wheels 16, or intermediate the front and rear axles.

The drive transmission 40 can be an automatic transmission, a manual transmission, or a semi-automatic transmission. The drive transmission 40 can include an input shaft, an output shaft, and a speed ratio assembly. A coupling can connect an output shaft of motor 42 to the transmission 40 and eventually to one or more of wheels 14, 16, 17. The coupling can permit selective engagement/disengagement of the input shaft with the motor output shaft, or at least relative rotation of the motor output shaft with respect to the input shaft, in any manner known in the art. Exemplary couplings can include, but are not limited to, a friction disc clutch and a torque converter.

The controller 56 located on the handle 18 can control the speed of motors 32, 42 and/or can control power output by battery 30, and/or can control a state of operation of transmission 40 (forward, reverse, neutral, speed, etc.). The input structure 54 located on the handle 18 can be configured, for example, to be a trigger for actuation of the locks 62, 64. In one embodiment, the input structure 54 can include at least one cable that extends through the handle 18 and connects to a spring biased pin that forms the lock 64. The cable, when actuated, can move the pin against the bias of the spring to disengage from an opening that forms lock structure 62. Thus, the handle 18 can be released from a locked position with respect to the housing 28 by actuation of input structure 54 to allow the handle 18 to rotate between use, storage and intermediate state positions. In addition, although only three positions are depicted, additional intermediate state positions can be added to these positions if desired for a particular lawn machine application such that the handle 18 has four or more locked positions with respect to the housing 28.

Embodiments are also intended to include or otherwise cover methods of using and methods of manufacturing the lawn machine 10. For example, the disclosed subject matter includes a method in which a user can convert the lawn machine between the storage state position to the use state position by disengaging lock structure 62s from lock structure 64 and rotating the handle 18 with respect to the housing 28 until lock structure 62i engages with lock structure 64 to place the machine 10 in the intermediate state position with the handle 18 extending at a substantially 45 degree angle (i.e., 45 plus or minus 15 degrees) with respect to the vertical (or the rotary axis RA of blade 22 when configured as a lawnmower). Once in the intermediate state position, the user can roll the machine 10 away from the storage area, such as away from a wall facing the blade 22 of the machine 10, similar to a manner in which luggage is moved about. Specifically, pulling on handle 18 can cause the machine 10 to roll via wheels 16 and 17 outward and towards the direction of the user pulling the machine 10. Once at a location of intended use, the user can pivot or rotate the machine 10 about a transverse axis, such as a rotary axis of rear main wheels 16, so that the storage wheels 17 move vertically upward and away from the ground surface GS and the front main wheels 14 move vertically downward towards the ground surface GS. It may be helpful to have the rear main wheels 16 on soil or wedged in position by a user's foot to keep the wheels 16 from moving laterally or rolling, and thus keeping the entire machine 10 rotating about the rotary axis of the rear wheels 16. Once the front main wheels 14 rotate through a substantially 90 degree arc they will reach the ground surface GS. The lock structure 64 can then be released from lock structure 62i and the handle 18 can be rotated upward until lock structure 64 mates with and locks with lock structure 62u and the handle 18 extends away from the housing 28. The machine 10 will then be in the use state position and ready to be operated along the ground surface GS. The reverse sequencing of steps can place the machine 10 from the use state position to the storage state position via any intermediate state position(s).

Although a drive motor 42 and transmission are described with respect to certain embodiments above, it should be understood that the lawn machine 10 may not include any drive motor or transmission and be moved relative to the ground surface solely by force of a user pushing or pulling on handle 18. In addition, handle 18 is shown as a U-shape structure having two elongate arms extending from proximal positions/portions 18p located adjacent the housing 28 to distal positions/portions spaced a greater distance from the housing 28 than the proximal positions/portions at which a cross bar joins the arms at their distal positions/portions to form a grip for the user. However, other types of configurations for the handle 18 are contemplated that would fall within the scope of the disclosed subject matter. For example, the handle 18 could include two arms that are never joined together along their lengths and terminate in grip structures that may or may not include controls features for operation by a user. Alternatively, the handle 18 could include a single arm that terminates at a distal end with a grip for operation by the user. In addition, multiple arms and multiple cross bars could be used to form the handle 18.

Although main wheels 14 and 16 are shown as separate stand alone rotary wheel structures, the wheels 14, 16 could be components of a tracked system in which an outermost portion of the track at a rear end of the track (at wheel 17) would form the tangent line TLR2 that is coplanar with tangent line TLS2 of the storage wheel 17. Thus, when in the storage state position, the bottom most contact points of the wheel(s) 17 and track would fall within the same place TP2. In this embodiment, a user would apply torque via handle 18 to the machine 10 (e.g., apply torque via handle 18 in a counterclockwise direction about storage wheel 17 in FIG. 2 if wheels 16 were replaced with a track in FIG. 2) to take weight off the track (reduce friction between track and ground surface GS) and allow the machine 10 to roll on wheels 17 out of the storage area.

What is claimed is:

1. An electric lawn machine, comprising:
   a housing including a deck;
   a rotary tool located under the deck and connected to the housing by a rotary shaft configured to rotate with respect to the housing about a rotary tool axis, the housing being moveable between a use position where the rotary tool axis is substantially perpendicular to a ground surface upon which the electric lawn machine is configured to travel and a storage position where the rotary tool axis is substantially parallel with the ground surface;
   a front pair of main wheels each connected to the housing about a respective one of a pair of front rotary main axes, and located at a front side of the housing;
   a rear pair of main wheels each connected to the housing about a respective one of a pair of rear rotary main axes, and located at a rear side of the housing such that the rotary shaft is located between the pair of rear rotary main axes and the pair of front rotary main axes;
   a handle connected to the housing at a connection location, the handle having two arms extending from the housing and moveable with respect to the housing between a storage state position and a use state position, wherein when the handle is in the use state position a substantial portion of the handle extends from the connection location and in a direction away from the rotary tools axis such that the rotary tool axis is spaced from and does not intersect with the handle, and when the handle is in the storage state position the substantial portion of the handle extends from the connection location and in a direction toward the rotary tool axis such that the rotary tool axis is located between the two arms of the handle;
   a storage plastic structure located at a position above the pair of rear wheels in a vertical direction parallel with the rotary tool axis, wherein the storage plastic structure has a coefficient of friction that is less than a coefficient of friction of the housing, and the storage plastic structure includes a first contact point with the ground surface when the housing is in the storage position, wherein
   the storage plastic structure is non-rotatable relative to the housing,
   the rear pair of main wheels are spaced away from the ground surface when the housing is in the storage position,
   the housing includes a second contact point with the ground surface when the housing is in the storage position,
   each of the first contact point and the second contact point is non-rotatable, and
   the second contact point is spaced away from the first contact point in a direction that is parallel to the rotary tool axis.

2. The electric lawn machine of claim 1, wherein the storage plastic structure includes a polyoxymethylene material skid structure.

3. The electric lawn machine of claim 1, wherein the housing includes a lock plate extending from the deck and including a lock structure configured to lock and unlock the handle to selectively prevent movement of the handle with respect to the housing.

4. The electric lawn machine of claim 3, wherein the lock structure includes one of a spring loaded pin structure and an aperture.

5. The electric lawn machine of claim 3, wherein the handle includes a mating lock structure configured to mate with the lock structure of the lock plate.

6. The electric lawn machine of claim 3, wherein the lock structure includes a use lock structure, an intermediate lock structure, and a storage lock structure, the use lock structure configured to lock the handle with respect to the housing in the use state position, the storage lock structure configured to lock the handle with respect to the housing in the storage state position, and the intermediate lock structure configured to lock the handle with respect to the housing in an intermediate state position, wherein when the handle is in the intermediate state position the handle is spaced from and located between the use state position and the storage state position.

7. The electric lawn machine of claim 6, wherein the use lock structure includes an opening in the lock plate located at a first position, the intermediate lock structure includes an opening in the lock plate located at a second position spaced from the first position a first linear distance, and the storage lock structure includes an opening in the lock plate located at a third position spaced from the first position a second linear distance that is longer then the first linear distance.

8. An electric lawn machine, comprising:
   a housing including a deck;
   an electric power source located adjacent the deck;
   a tool located within the housing and electrically connected to the electric power source to rotate about a rotary tool axis;
   a front pair of main wheels each connected to the housing about a respective one of a pair of front rotary main axes, and located at a front side of the housing;
   a rear pair of main wheels each connected to the housing about a respective one of a pair of rear rotary main axes, and located at a rear side of the housing;
   a handle connected to the housing at a handle connection location, the handle having a proximal end and a distal end, the proximal end connected to the housing at the handle connection location and extending away from the housing to the distal end of the handle, the distal end of the handle configured for gripping by a user during use, the handle moveably connected with respect to the housing between a storage state position and a use state position, wherein when the handle is in the use state position the distal end of the handle is located a first distance from the power source, and when the handle is in the storage state position the distal end of the handle is located a second distance from the power source, wherein the first distance is larger than the second distance;

a storage plastic structure located at a position above the pair of rear wheels in a vertical direction such that the storage plastic structure is configured to contact the ground surface when the electric lawn machine is in a storage position rotated away from the use position, wherein the storage plastic structure includes a first contact point with the ground surface when the housing is in the storage position, the storage plastic structure is non-rotatable relative to the housing, the rear pair of main wheels are spaced away from the ground surface when the housing is in the storage position, the housing includes a second contact point with the ground surface when the housing is in the storage position, each of the first contact point and the second contact point is non-rotatable, and the second contact point is spaced away from the first contact point in a direction that is parallel to the rotary tool axis.

9. The electric lawn machine of claim 8, wherein the housing includes a lock plate extending from the deck and including a lock structure configured to lock and unlock the handle to selectively prevent movement of the handle with respect to the housing, wherein the lock structure includes a use lock structure, an intermediate lock structure, and a storage lock structure, the use lock structure configured to lock the handle with respect to the housing in the use state position, the storage lock structure configured to lock the handle with respect to the housing in the storage state position, and the intermediate lock structure configured to lock the handle with respect to the housing in an intermediate state position, wherein when the handle is in the intermediate state position the handle is spaced from and located between the use state position and the storage state position.

10. The electric lawn machine of claim 9, wherein the use lock structure includes an opening in the lock plate located at a first position, the intermediate lock structure includes an opening in the lock plate located at a second position spaced from the first position a first linear distance, and the storage lock structure includes an opening in the lock plate located at a third position spaced from the first position a second linear distance that is longer than the first linear distance.

11. The electric lawn machine of claim 9, wherein the lock structure includes one of a spring loaded pin structure and an opening, and the handle includes a mating lock structure configured to mate with the lock structure of the lock plate.

12. An electric lawn machine, comprising:
a housing;
a tool located in the housing;
an electric power source located in the housing and configured to rotate the tool about a rotary tool axis;
a front pair of main wheels each connected to the housing about a respective one of a pair of front wheel axes, and located at a front side of the housing;
a rear pair of main wheels each connected to the housing about a respective one of a pair of rear wheel axes, and located at a rear side of the housing; and
a storage plastic structure located at a rear side of the housing and spaced from the rear pair of main wheels in a vertical direction, wherein
the housing is configured to be placed upon a ground surface in
a use position in which the front pair of main wheels and the rear pair of main wheels contact the ground surface, such that the electric lawn machine is configured to traverse the ground surface during operation of the tool via rolling of the front pair of main wheels and rear pair of main wheels, and
a storage position in which the storage plastic structure contacts the ground surface, such that the electric lawn machine is configured to traverse the ground surface and be placed into storage via sliding the storage plastic structure along the ground surface, wherein the storage plastic structure includes a first contact point with the ground surface when the housing is in the storage position, the storage plastic structure is non-rotatable relative to the housing, and the rear pair of main wheels are spaced away from the ground surface when the housing is in the storage position, the housing includes a second contact point with the ground surface when the housing is in the storage position, each of the first contact point and the second contact point is non-rotatable, and the second contact point is spaced away from the first contact point in a direction that is parallel to the rotary tool axis.

13. The electric lawn machine of claim 12, wherein the electric power source is configured to provide power to rotate at least one wheel of:
a wheel of the pair of front main wheels and a wheel of the pair of rear main wheels,
when the housing is in the use position.

14. The electric lawn machine of claim 12, further comprising:
a handle connected to the housing at a connection location, the handle having two arms extending from the housing and moveable with respect to the housing between a storage state position and a use state position, wherein
the tool includes a blade connected to the housing via a rotary shaft that is configured to rotate about a rotary axis, and
when the handle is in the use state position a substantial portion of the handle extends from the connection location and in a direction away from the rotary axis such that the rotary axis is spaced from and does not intersect with the handle, and when the handle is in the storage state position the substantial portion of the handle extends from the connection location and in a direction toward the rotary axis such that the rotary axis is located between the two arms of the handle.

15. The electric lawn machine of claim 14, wherein the housing includes a lock structure configured to lock and unlock the handle to selectively prevent movement of the handle with respect to the housing, wherein the lock structure includes a use lock structure, an intermediate lock structure, and a storage lock structure, the use lock structure configured to lock the handle with respect to the housing in the use state position, the storage lock structure configured to lock the handle with respect to the housing in the storage state position, and the intermediate lock structure configured to lock the handle with respect to the housing in an intermediate state position, wherein when the handle is in the intermediate state position the handle is spaced from and located between the use state position and the storage state position.

16. A method of using the electric lawn machine of claim 15, comprising:
   moving the handle from the storage state position to the intermediate state position;
   sliding the lawn machine along a ground surface via the storage plastic structure by applying a force to the handle when the handle is in the intermediate state position;
   moving the handle from the intermediate state position to the use state position; and
   rolling the lawn machine along the ground surface via rolling of the rear pair of main wheels and front pair of main wheels while the handle is in the use state position.

* * * * *